United States Patent
Chakravarti et al.

(10) Patent No.: US 9,365,422 B2
(45) Date of Patent: Jun. 14, 2016

(54) METHOD AND SYSTEM FOR PRODUCING A SYNTHESIS GAS IN AN OXYGEN TRANSPORT MEMBRANE BASED REFORMING SYSTEM WITH RECYCLING OF THE PRODUCED SYNTHESIS GAS

(71) Applicants: Shrikar Chakravarti, East Amherst, NY (US); Brian R. Kromer, Buffalo, NY (US); Keith A. Craigie, N. Tonawanda, NY (US); Sean M. Kelly, Pittsford, NY (US); Juan Li, Clarence, NY (US)

(72) Inventors: Shrikar Chakravarti, East Amherst, NY (US); Brian R. Kromer, Buffalo, NY (US); Keith A. Craigie, N. Tonawanda, NY (US); Sean M. Kelly, Pittsford, NY (US); Juan Li, Clarence, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 0 days.

(21) Appl. No.: 14/098,731

(22) Filed: Dec. 6, 2013

(65) Prior Publication Data
US 2014/0319427 A1    Oct. 30, 2014

Related U.S. Application Data

(60) Provisional application No. 61/816,297, filed on Apr. 26, 2013.

(51) Int. Cl.
*C01B 3/24* (2006.01)
*C01B 3/38* (2006.01)
*C01B 13/02* (2006.01)

(52) U.S. Cl.
CPC ............... *C01B 3/382* (2013.01); *C01B 3/384* (2013.01); *C01B 13/0251* (2013.01); *C01B 2203/0233* (2013.01); *C01B 2203/0283* (2013.01); *C01B 2203/043* (2013.01); *C01B 2203/0822* (2013.01); *C01B 2203/0827* (2013.01); *C01B 2203/142* (2013.01); *Y02P 20/128* (2015.11)

(58) Field of Classification Search
USPC ............... 95/45; 252/373; 48/127.7, 127.9
See application file for complete search history.

(56) References Cited

U.S. PATENT DOCUMENTS

| | | |
|---|---|---|
| 4,650,814 A | 3/1987 | Keller |
| 6,048,472 A | 4/2000 | Nataraj et al. |

(Continued)

FOREIGN PATENT DOCUMENTS

| | | |
|---|---|---|
| EP | 0 926 096 A1 | 6/1999 |
| EP | 0 984 500 A2 | 3/2000 |

(Continued)

OTHER PUBLICATIONS

Friedemann Marschner et al., "Gas Production", Ullmann's Encyclopedia of Industrial Chemistry, Jun. 15, 2000, pp. 1-21, XP002253967.

*Primary Examiner* — Stanley Silverman
*Assistant Examiner* — Syed Iqbal
(74) *Attorney, Agent, or Firm* — Ralph J. Mancini (57) ABSTRACT

A method and system for producing a synthesis gas in an oxygen transport membrane based reforming system that utilizes a combined feed stream having a steam to carbon ratio between about 1.6 and 3.0 and a temperature between about 500° C. and 750° C. The combined feed stream is comprised a pre-reformed hydrocarbon feed, superheated steam, and a reaction product stream created by the reaction of a hydrogen containing stream reacted with the permeated oxygen at the permeate side of the oxygen transport membrane elements and wherein the hydrogen containing stream is a recycled portion of the synthesis gas.

16 Claims, 4 Drawing Sheets

(56) References Cited

U.S. PATENT DOCUMENTS

| | | |
|---|---|---|
| 6,077,323 A | 6/2000 | Nataraj et al. |
| 6,110,979 A | 8/2000 | Nataraj et al. |
| 6,114,400 A | 9/2000 | Nataraj et al. |
| 6,214,066 B1 | 4/2001 | Nataraj et al. |
| 6,293,084 B1 | 9/2001 | Drnevich et al. |
| 6,296,686 B1 | 10/2001 | Prasad et al. |
| 6,360,524 B1 | 3/2002 | Drnevich et al. |
| 6,382,958 B1 | 5/2002 | Bool, III et al. |
| 6,394,043 B1 | 5/2002 | Bool, III et al. |
| 6,562,104 B2 | 5/2003 | Bool, III et al. |
| 7,261,751 B2 | 8/2007 | Dutta et al. |
| 7,470,811 B2 | 12/2008 | Thiebaut |
| 7,786,180 B2 | 8/2010 | Fitzpatrick |
| 7,856,829 B2 | 12/2010 | Shah et al. |
| 8,196,387 B2 | 6/2012 | Shah et al. |
| 8,262,755 B2 * | 9/2012 | Repasky et al. .............. 48/127.9 |
| 8,349,214 B1 | 1/2013 | Kelly et al. |
| 8,419,827 B2 | 4/2013 | Repasky et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2007/0004809 A1 | 1/2007 | Lattner et al. |
| 2007/0041894 A1 | 2/2007 | Drnevich |
| 2007/0289215 A1 | 12/2007 | Hemmings et al. |
| 2007/0292342 A1 | 12/2007 | Hemmings et al. |
| 2008/0302013 A1 * | 12/2008 | Repasky et al. .............. 48/127.9 |
| 2009/0120379 A1 | 5/2009 | Bozzuto et al. |
| 2010/0276119 A1 | 11/2010 | Doty |
| 2011/0067405 A1 | 3/2011 | Armstrong et al. |
| 2011/0076213 A1 | 3/2011 | Carolan et al. |
| 2011/0142722 A1 | 6/2011 | Hemmings et al. |
| 2013/0009102 A1 | 1/2013 | Kelly et al. |
| 2014/0183866 A1 | 7/2014 | Kromer et al. |
| 2014/0319424 A1 | 10/2014 | Chakravarti et al. |
| 2014/0319427 A1 | 10/2014 | Chakravarti et al. |
| 2014/0323597 A1 | 10/2014 | Stuckert et al. |
| 2014/0323598 A1 | 10/2014 | Chakravarti et al. |

FOREIGN PATENT DOCUMENTS

| | | |
|---|---|---|
| EP | 0 989 093 A2 | 3/2000 |
| EP | 1 504 811 A1 | 2/2005 |
| WO | WO 2014/107707 A2 | 7/2014 |

* cited by examiner

METHOD AND SYSTEM FOR PRODUCING A SYNTHESIS GAS IN AN OXYGEN TRANSPORT MEMBRANE BASED REFORMING SYSTEM WITH RECYCLING OF THE PRODUCED SYNTHESIS GAS

CROSS REFERENCE TO RELATED APPLICATIONS

This application claims priority to and the benefit of U.S. provisional patent application Ser. No. 61/816,297 filed on Apr. 26, 2013, the disclosure of which is incorporated by reference herein.

FIELD OF THE INVENTION

The present invention relates to a method and system for producing a synthesis gas in an oxygen transport membrane based reforming system, and more particularly, a method and system for producing a synthesis gas in an oxygen transport membrane based reforming system that utilizes a combined feed stream comprised a pre-reformed hydrocarbon feed, superheated steam, and a reaction product stream created by the reaction of a hydrogen containing stream reacted with the permeated oxygen at the permeate side of oxygen transport membrane elements, wherein the hydrogen containing stream is a recycled portion of the synthesis gas.

BACKGROUND

Synthesis gas containing hydrogen and carbon monoxide is used for a variety of industrial applications, for example, the production of hydrogen, chemicals and synthetic fuel production. Conventionally, the synthesis gas is produced in a fired reformer in which natural gas and steam is reformed in nickel catalyst containing reformer tubes at high temperatures (e.g., 850° C. to 1000° C.) and moderate pressures (e.g., 16 to 30 bar) to produce the synthesis gas. The endothermic heating requirements for steam methane reforming reactions occurring within the reformer tubes are provided by burners firing into the furnace that are fueled by part of the natural gas. In order to increase the hydrogen content of the synthesis gas produced by the steam methane reforming (SMR) process, the synthesis gas can be subjected to water-gas shift reactions to react residual steam in the synthesis gas with the carbon monoxide.

A well established alternative to steam methane reforming is the non-catalytic partial oxidation process (POx) whereby a substoichiometric amount of oxygen is allowed to react with the natural gas feed creating steam and carbon dioxide at high temperatures. The high temperature residual methane is reformed through reactions with the high temperature steam and carbon dioxide.

An attractive alternative process for producing synthesis gas is the autothermal reformer (ATR) process which uses oxidation to produce heat with a catalyst to permit reforming to occur at lower temperatures than the POx process. Similar to the POx process, oxygen is required to partially oxidize natural gas in a burner to provide heat, high temperature carbon dioxide and steam to reform the residual methane. Normally some steam needs to be added to the natural gas to control carbon formation on the catalyst. However, both the ATR as well as POx processes require separate air separation units (ASU) to produce high-pressure oxygen, which adds complexity as well as capital and operating cost to the overall process.

When the feedstock contains significant amounts of heavy hydrocarbons, SMR and ATR processes, are typically preceded by a pre-reforming step. Pre-reforming is a catalyst based process for converting higher hydrocarbons to methane, hydrogen, carbon monoxide and carbon dioxide. The reactions involved in pre-reforming are endothermic. Most pre-reformers operate adiabatically, and thus the pre-reformed feedstock leaves at a much lower temperature than the feedstock entering the pre-reformer. Another process that will be discussed in this invention is the secondary reforming process, which is essentially an autothermal process that is fed the product from a steam methane reforming process. Thus, the feed to a secondary reforming process is primarily synthesis gas from steam methane reforming. Depending on the end application, some natural gas may bypass the SMR process and be directly introduced into the secondary reforming step. Also, when a SMR process is followed by a secondary reforming process, the SMR may operate at a lower temperature, e.g. 650° C. to 825° C. versus 850° C. to 1000° C.

As can be appreciated, the conventional methods of producing a synthesis gas such as have been discussed above are expensive and require complex installations. To overcome the complexity and expense of such installations it has been proposed to generate the synthesis gas within reactors that utilize an oxygen transport membrane to supply oxygen and thereby generate the heat necessary to support endothermic heating requirements of the steam methane reforming reactions. A typical oxygen transport membrane has a dense layer that, while being impervious to air or other oxygen containing gas, will transport oxygen ions when subjected to an elevated operational temperature and a difference in oxygen partial pressure across the membrane.

Examples of oxygen transport membrane based reforming systems used in the production of synthesis gas can be found in U.S. Pat. Nos. 6,048,472; 6,110,979; 6,114,400; 6,296,686; 7,261,751; 8,262,755; and 8,419,827. The problem with all of these oxygen transport membrane based systems is that because such oxygen transport membranes need to operate at high temperatures of around 900° C. to 1100° C., preheating of the hydrocarbon feed to similarly high temperatures is often required. Where hydrocarbons such as methane and higher order hydrocarbons are subjected to such high temperatures, excessive carbon formation will occur in the feed stream, especially at high pressures and low steam to carbon ratios. The carbon formation problems are particularly severe in the above-identified prior art oxygen transport membrane based systems. A different approach to using an oxygen transport membrane based reforming system in the production of synthesis gas is disclosed in U.S. Pat. No. 8,349,214 which provides a reactively driven oxygen transport membrane based reforming system that uses hydrogen and carbon monoxide as part of the reactant gas feed which address many of the highlighted problems with the earlier oxygen transport membrane systems.

Other problems that arise with the prior art oxygen transport membrane based reforming systems are the cost of the oxygen transport membrane modules and the lower than desired durability, reliability and operating availability of such oxygen transport membrane based reforming systems. These problems are the primary reasons that oxygen transport membranes based reforming systems have not been successfully commercialized. Advances in oxygen transport membrane materials have addressed problems associated with oxygen flux, membrane degradation and creep life, but there is much work left to be done to achieve commercially viable oxygen transport membrane based reforming systems from a cost standpoint as well as from an operating reliability and availability standpoint.

The present invention addresses the aforementioned problems by providing an improved process for making synthesis gas using a reactively-driven oxygen transport membrane based reforming system that comprises an oxidation process occurring at the permeate side of the oxygen transport membranes and a reforming process facilitated by a reforming catalyst in close proximity to the reactively-driven oxygen transport membranes. The oxidation process, which is exothermic, and the reforming process, which is endothermic, both occur within the oxygen transport membrane based reforming system and thus have a high degree of thermal integration so that heat released in the oxidation process supplies the heat absorbed by the reforming process.

Specifically, the improvements to the reactively-driven oxygen transport membrane based reforming system include modifications to the steam and hydrocarbon feed stream to increase steam to carbon ratio thereby reducing methane slip, mitigating carbon formation issues within the system and reducing the hydrocarbon feed requirements to the reformers. It has been found that conditioning the steam and hydrocarbon feed stream feed stream to a particular temperature range and steam to carbon ratio translates into an optimum operating regime with noticeably less reliability problems in the oxygen transport membrane based reforming system due to carbon formation. In addition, using a reactively driven oxygen transport membrane system with hydrogen and carbon-monoxide as a portion of the reactant gas mixture produces a higher oxygen flux compared to reactively-driven oxygen transport membranes that use only steam-methane feed as the reactant gas mixture mixtures which produce a lower flux. The actual difference in flux performance is a function of pressure, temperature, and reactant gas concentrations.

Additional improvements to the reactively-driven oxygen transport membrane based reactor and system include modifications to the heat recovery train and synthesis gas recycle loop to mitigate metal dusting and carbon formation issues that adversely impact system performance, reliability and durability. In addition, modifications or changes to the synthesis gas recycle loop allows for use of higher temperature synthesis gas in the recycle loop which decreases the oxygen requirement compared to previous reactively-driven oxygen transport membrane based reformer reactor designs.

SUMMARY OF THE INVENTION

The present invention may be characterized as a method for producing a synthesis gas in an oxygen transport membrane based reforming system, which comprises two reactors, a reforming catalyst containing reformer reactor and an oxidation catalyst containing oxygen transport membrane reactor preferably in the form of tubes, the method comprising the steps of: (i) separating an oxygen containing stream into an oxygen permeate and an oxygen depleted retentate stream using a plurality of oxygen transport membrane elements disposed in the oxygen transport membrane based reforming system; (ii) reacting a hydrogen containing stream contacting a permeate side of the oxygen transport membrane elements with the oxygen permeate to generate a reaction product stream and heat; (iii) pre-heating a hydrocarbon containing feed stream and combining the pre-heated hydrocarbon containing feed stream with steam and then with a portion of the reaction product stream to produce a combined feed stream having a steam to carbon ratio between about 1.6 and 3.0 and a temperature between about 500° C. and 750° C.; (iv) reforming the combined feed steam in the at least one catalyst containing reforming reactor in the presence of the catalyst and the heat generated by the reaction of the hydrogen containing stream and permeated oxygen to produce a synthesis gas stream, the at least one catalyst containing reforming reactor disposed proximate the oxygen transport membrane elements; and (v) recycling a portion of the synthesis gas stream to the permeate side of the plurality of oxygen transport membrane elements to form all or a part of the hydrogen containing stream wherein the recycled portion of the synthesis gas is maintained at a temperature of less than about 400° C. or a temperature of greater than about 800° C. such that the oxygen transport membrane based reforming system is substantially free of metal dusting corrosion.

In various embodiments, the step of recycling a portion of the synthesis gas stream may further comprise directing a portion of the synthesis gas stream exiting the at least one catalyst containing reforming reactor to the permeate side of the oxygen transport membrane elements to form all or a part of the hydrogen containing stream that reacts with the permeated oxygen to generate the reaction product stream and the heat, wherein the temperature of the recycled portion of the synthesis gas stream is greater than about 800° C. Alternatively, the step of recycling a portion of the synthesis gas stream may further comprise the steps of (vi) cooling the synthesis gas stream exiting the at least one catalyst containing reforming reactor to a temperature less than about 400° C.; (vii) optionally compressing a portion of the cooled synthesis gas stream and maintaining the temperature of the cooled, compressed synthesis gas stream at a temperature less than about 400° C.; and (viii) directing the cooled, compressed synthesis gas stream at a temperature less than about 400° C. to the permeate side of the oxygen transport membrane elements to form all or a part of the hydrogen containing stream that reacts with the permeated oxygen to generate the reaction product stream and the heat.

The combined feed stream may be produced using an ejector, eductor, or venturi based device configured to suction the reaction product stream at the permeate side of the oxygen transport membrane elements into the ejector, eductor, or venturi based device with a motive fluid comprising the hydrocarbon containing feed stream or the hydrocarbon containing feed stream with steam. The hydrocarbon containing feed stream may be pre-heated via indirect heat exchange with the synthesis gas stream or via indirect heat exchange with the oxygen depleted retentate stream or both. The combined feed stream preferably has a steam to carbon ratio between about 1.6 and 3.0 and a temperature between about 500° C. and 750° C. Likewise, the steam may preferably be heated via indirect heat exchange with the synthesis gas stream or the oxygen depleted retentate stream or both to produce superheated steam at a pressure of between about 15 bar to 80 bar and a temperature of between about 300° C. and 600° C.

The present invention may also be characterized as an oxygen transport membrane based reforming system for producing synthesis gas comprising: (a) a reactor housing; (b) at least one catalyst containing reforming reactor disposed in the reactor housing and configured to produce a synthesis gas stream by reacting a combined feed stream in the presence of the catalyst and heat; (c) a reactively driven oxygen transport membrane reactor disposed in the reactor housing proximate the at least one catalyst containing reforming reactor, the reactively driven oxygen transport membrane reactor comprising a plurality of oxygen transport membrane elements configured to separate oxygen from an oxygen containing feed stream and produce an oxygen permeate at a permeate side of the oxygen transport membrane elements and an oxygen depleted retentate stream at a retentate side of the oxygen transport membrane elements; (d) a hydrogen containing stream in contact with the permeate side of the plurality of oxygen transport membrane elements, wherein the permeated oxygen reacts with the hydrogen containing stream to reactively drive the separation of oxygen from the oxygen containing feed stream and to generate a reaction product stream and heat that is transferred to the oxygen depleted retentate stream and to at least one catalyst containing reforming reactor; and (e) a synthesis gas recycle circuit configured to recycle a portion of the synthesis gas stream to the permeate side of the plurality of oxygen transport membrane elements to form all or a part of the hydrogen containing stream and wherein the recycled portion of the heated synthesis gas is maintained at a temperature of less than about 400° C. or a temperature of greater than about 800° C., wherein the combined feed stream comprises a hydrocarbon containing feed, steam and the reaction product stream.

In various embodiments, the synthesis gas recycle circuit may comprise a fluidic connection between the heat exchange network and the permeate side of the plurality of oxygen transport membrane elements to recirculate a portion of the cooled synthesis gas to the permeate side of the oxygen transport membrane elements as all or a portion of the hydrogen containing stream while maintaining the temperature of the cooled, compressed portion of the synthesis gas stream at a temperature less than about 400° C. Alternatively, the synthesis gas recycle circuit may comprise a fluidic connection disposed within the reactor housing between an outlet of the catalyst containing reforming reactor and the permeate side of the oxygen transport membrane elements and configured to recirculate a portion of the synthesis gas exiting the catalyst containing reforming reactor to the permeate side of the oxygen transport membrane elements as all or a portion of the hydrogen containing stream while maintaining the temperature of the synthesis gas stream at a temperature greater than about 800° C.

To produce the combined feed stream, the present oxygen transport membrane based reforming system may also include an ejector, eductor, or venturi based device configured to suction the reaction product stream at the permeate side of the oxygen transport membrane elements into and mix with a motive fluid comprising the hydrocarbon containing feed stream or the hydrocarbon containing feed stream with steam.

Also, the present system may include a heat exchange network configured to: (i) cool the synthesis gas stream exiting the at least one catalyst containing reforming reactor to a temperature of less than about 400° C.; (ii) produce the steam, and (iii) pre-heat the hydrocarbon containing feed stream. In particular, the hydrocarbon containing feed stream and/or steam may be pre-heated via indirect heat exchange with the synthesis gas stream or via indirect heat exchange with the oxygen depleted retentate stream or both. Heating the steam ideally produces superheated steam at a pressure of between about 15 bar to 80 bar and a temperature of between about 300° C. and 600° C. Either as part of the heat exchange network or as a separate subsystem, the present oxygen transport membrane based reforming system may also include a duct burner disposed in an oxygen depleted retentate stream duct and configured to produce a heated exhaust stream using the oxygen depleted retentate stream and a source of supplemental fuel and a continuously rotating ceramic regenerator configured to transfer heat from the heated exhaust stream to the oxygen containing feed stream.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

For the sake of avoiding repetition, some of the common elements in the various Figures utilize the same numbers where the explanation of such elements would not change from Figure to Figure.

DETAILED DESCRIPTION

Figure 1:
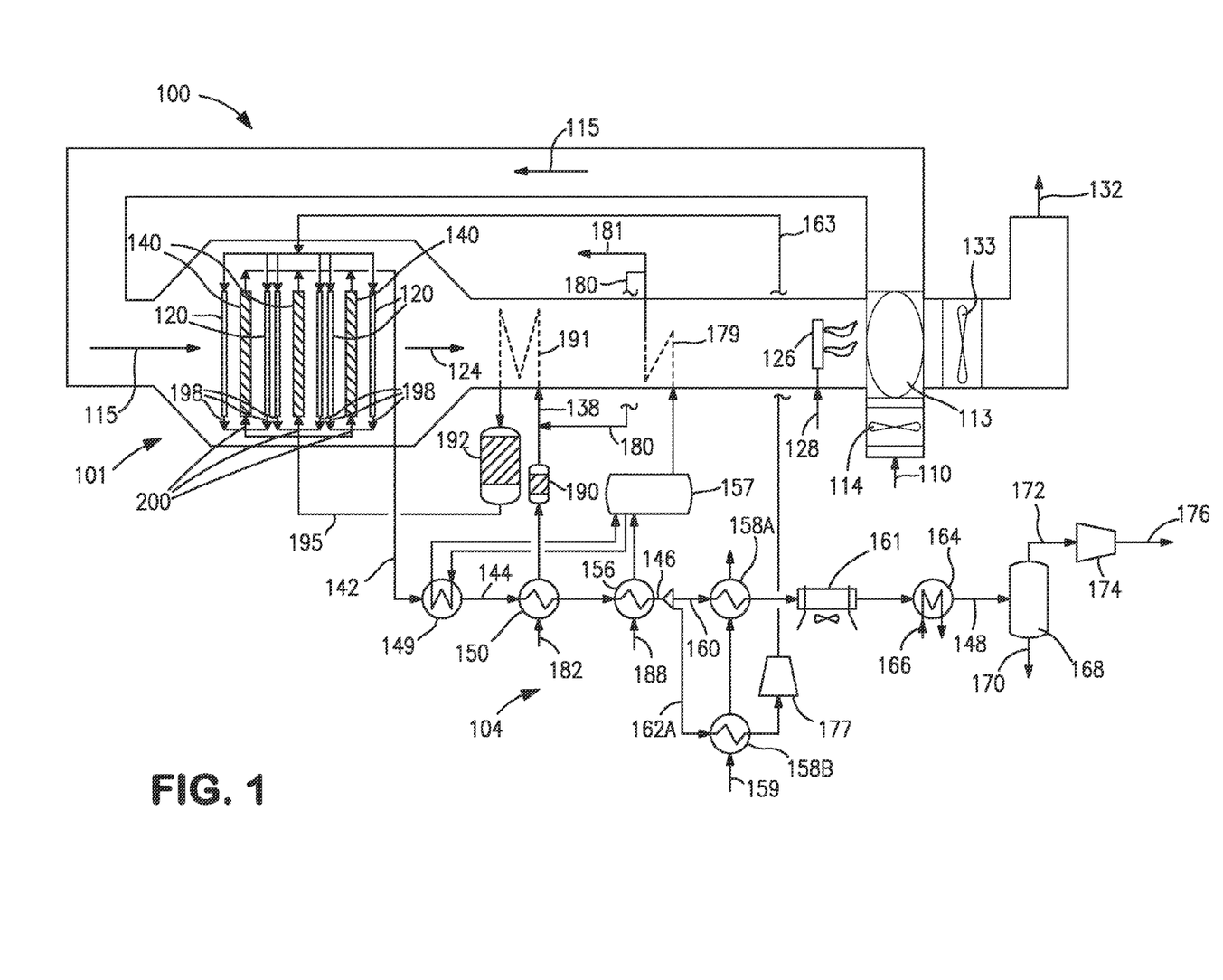
FIG. 1 is a schematic illustration of an embodiment of an oxygen transport membrane based reforming system in accordance with the present invention.

Turning now to FIG. 1, there is shown a schematic illustration of an embodiment of an oxygen transport membrane based reforming system 101 and assembly 100 in accordance with the present invention. As seen therein, an oxygen containing stream 110, such as air, is introduced to the system by means of a blower or fan 114 into a heat exchanger 113 for purposes of preheating the oxygen containing stream 110. Heat exchanger 113 is preferably a high efficiency, cyclic and continuously rotating regenerator disposed in operative association with the oxygen containing stream 110 and the heated retentate stream 124. The heated and oxygen depleted retentate stream 124 can optionally be introduced into a duct burner region containing duct burner 126 and used to support combustion of a supplemental fuel stream 128 to produce supplemental heat introduced into the continuously rotating regenerator 113 to preheat the oxygen containing stream 110. Alternatively, the duct burner may also be disposed directly in the duct leaving heat exchanger 113 to pre-heat the oxygen containing stream 110. Exhaust stream 132 from heat exchanger 113 is discharged.

The heated oxygen containing stream 115 is then directed via the intake duct to the oxygen transport membrane elements 120 incorporated into the oxygen transport membrane based reforming system 101. Each of the oxygen transport membrane elements 120 are preferably configured as a multilayered ceramic tube capable of conducting oxygen ions at an elevated operational temperature, wherein the retentate side of the oxygen transport membrane elements 120 is the exterior surface of the ceramic tubes exposed to the oxygen containing stream and the permeate side is the interior surface of the ceramic tubes. Although only six oxygen transport membrane elements 120 are illustrated in close proximity to three catalytic reforming tubes 140, as would occur to those skilled in the art, there could be many of such oxygen transport membrane elements and many catalytic reforming tubes in each oxygen transport membrane sub-system. Likewise, there would be multiple oxygen transport membrane sub-systems used in an industrial application of the oxygen transport membrane based reforming system 101.

A hydrogen containing stream is also introduced into the permeate side of the oxygen transport membrane elements 120 and is oxidized though reaction with the permeated oxygen to produce a reaction product stream 198 and heat. As described in more detail below, the hydrogen containing stream is preferably a recycled portion of the produced synthesis gas 163. As a result of the separation of the oxygen and the reaction (i.e. combustion) occurring at the permeate side of oxygen transport membrane elements 120, a heated and oxygen depleted retentate stream 124 is also formed.

The reaction of the hydrogen containing stream or recycled synthesis gas stream 163 at the permeate side of the oxygen transport membrane element 120 produces heat. Radiation of this heat together with the convective heat transfer provided by heated retentate stream 124 heats the catalytic reactor tubes 140 to supply the endothermic heating requirements of the steam methane reforming occurring in catalytic reactor tubes 140. As the heated retentate stream 124 exits the oxygen transport membrane based reforming system 101, it also heats a reformer feed stream 138 to a temperature between about 450° C. and 650° C. via indirect heat transfer using one or more coils 191 disposed in the retentate duct such that the oxygen depleted retentate stream 124 heats the feed streams passing through the coils 191.

The hydrocarbon containing feed stream 182 to be reformed is preferably natural gas. Depending on the supply pressure, the natural gas is compressed or let down to the desired pressure via a compressor or valve arrangement (not shown) and then preheated in heat exchanger 150 that serves as a feed preheater. Also, since the natural gas typically contains unacceptably high level of sulfur species, the natural gas feed stream 182 undergoes a sulfur removal process such as hydro-treating, via device 190, to reduce the sulfur species to $H_2S$, which is subsequently removed in a guard bed using material like ZnO and/or CuO. To facilitate the desulfurization, a small amount of hydrogen or hydrogen-rich gas (not shown) is added to stream 182 before heat exchanger 150. The hydro-treating step also saturates any alkenes present in the hydrocarbon containing feed stream. Further, since natural gas generally contains higher hydrocarbons that will break down at high temperatures to form unwanted carbon deposits that adversely impact the reforming process, the natural gas feed stream 182 is preferably pre-reformed in an adiabatic pre-reformer 192, which converts higher hydrocarbons to methane, hydrogen, carbon monoxide, and carbon dioxide. Pre-reformers are typically catalyst-based systems. Although not shown, this pre-reformed reformer feed stream 195 may be further heated via indirect heat exchange with heated retentate stream 124. Also contemplated, but not shown is an embodiment where the pre-reformer is a heated pre-reformer that is thermally coupled with oxygen transport membrane based reforming system.

In the illustrated embodiment, the above-described heated reaction product stream 198 is combined with the heated pre-reformed reformer feed stream 195 to produce a combined feed stream 200 that contains steam and hydrocarbons. This combined feed stream is introduced into the catalytic reactor tubes 140 where the combined feed stream 200 is subjected to steam methane reforming to produce a synthesis gas stream 142. The temperature of the combined feed stream 200 is between about 500° C. and 750° C., and more preferably between about 600° C. and 750° C. Steam 180 may also be added to the combined feed stream 200, the natural gas feed stream 182, or the preheated pre-reformed reformer feed stream 195, as required, to adjust the temperature of stream 200 as well as the steam to carbon ratio of stream 200 to between about 1.6 and 3.0, and more preferably to steam to carbon ratio between about 2.0 and 2.8. The steam is preferably superheated steam 180 between about 15 bar and 80 bar and between about 300° C. and 600° C. and heated by means of indirect heat exchange with the heated retentate stream 124 using steam coils 179 disposed in the retentate duct. The superheated steam 180 is preferably added to the hydrocarbon containing feed stream 182 upstream of the pre-reformer 192 to adjust the steam to carbon ratio and final temperature of the combined feed stream 200. Also, to optimize the economic performance of the oxygen transport membrane based reforming system in a methanol production process, the methane slip should be less than 4.5 percent by volume and preferably less than 2.5 percent by volume.

The synthesis gas stream 142 produced by the oxygen transport membrane based reforming system 101 generally contains hydrogen, carbon monoxide, unconverted methane, steam, carbon dioxide and other constituents. Heat exchange section 104 is designed to cool the produced synthesis gas stream 142 and recycle a portion of the synthesis gas stream 162A to form all or a part of the hydrogen containing stream 163. In this illustrated embodiment, the synthesis gas stream 142 is preferably cooled before recycling such stream using a synthesis gas recycle compressor 177 or other blower means. The heat exchange section 104 is also designed such that in cooling the synthesis gas stream 142, various feed streams are preheated and process steam is also generated.

The initial cooling of synthesis gas stream 142 is accomplished with steam generation in a process gas boiler (PG boiler) 149 coupled to steam drum 157 and designed to reduce the temperature of the cooled synthesis gas 144 to about 400° C. or less. As illustrated in FIG. 1, the initially cooled synthesis gas stream 144 is successively further cooled in a heat exchange network that includes hydrocarbon feed preheater 150, economizer 156, feed water heaters 158A and 158B, synthesis gas cooler 161 and water cooled heat exchanger 164. Specifically, the initially cooled synthesis gas stream 144 is directed to the feed preheater 150 to heat the natural gas feed stream 182 and then is directed to the economizer 156 to heat boiler feed water 188. The boiler feed water stream 188 is preferably pumped using a feed water pump (not shown), heated in economizer 156 and sent to steam drum 157.

The cooled synthesis gas stream 146 is then divided into a first portion 160 and a second or recycled portion 162A. First portion 160 is further cooled in a series of steps including a feed water heater 158A, used to heat feed water stream 159, followed by a synthesis gas cooler 161 and a subsequent water cooled heat exchanger 164 cooled via a separate cooling water stream 166. The heated feed water 159 is directed to a de-aerator (not shown) that provides boiler feed water 188. The resulting fully cooled synthesis gas stream 148 is then introduced into a knock-out drum 168 from which a condensate stream 170 is drained to produce a fully cooled synthesis gas stream 172. The fully cooled synthesis gas stream 172 is optionally compressed in a synthesis gas compressor 174 to produce a synthesis gas product 176.

The second or recycle portion 162A of the initially cooled synthesis gas stream 144 is directed to a second feed water heater 158B, used to heat feed water stream 159, and this cooled recycle synthesis gas stream 163 is recirculated back to the permeate side of the oxygen transport membrane element 120 by means of a recycle compressor 177. Also note that any superheated steam not added or used in the natural gas feed 182 or recycle synthesis gas stream 163 is exported steam 181 that may be used for power generation.

When customized as a supplemental source of synthesis gas for a methanol production process, the oxygen transport membrane produced synthesis gas should have a module of between about 1.5 and 2.0. In addition, such produced synthesis gas stream ideally has a methane slip of less than about 4.5 percent by volume and more preferably, a methane slip of less than about 2.5 percent by volume.

Figure 2:
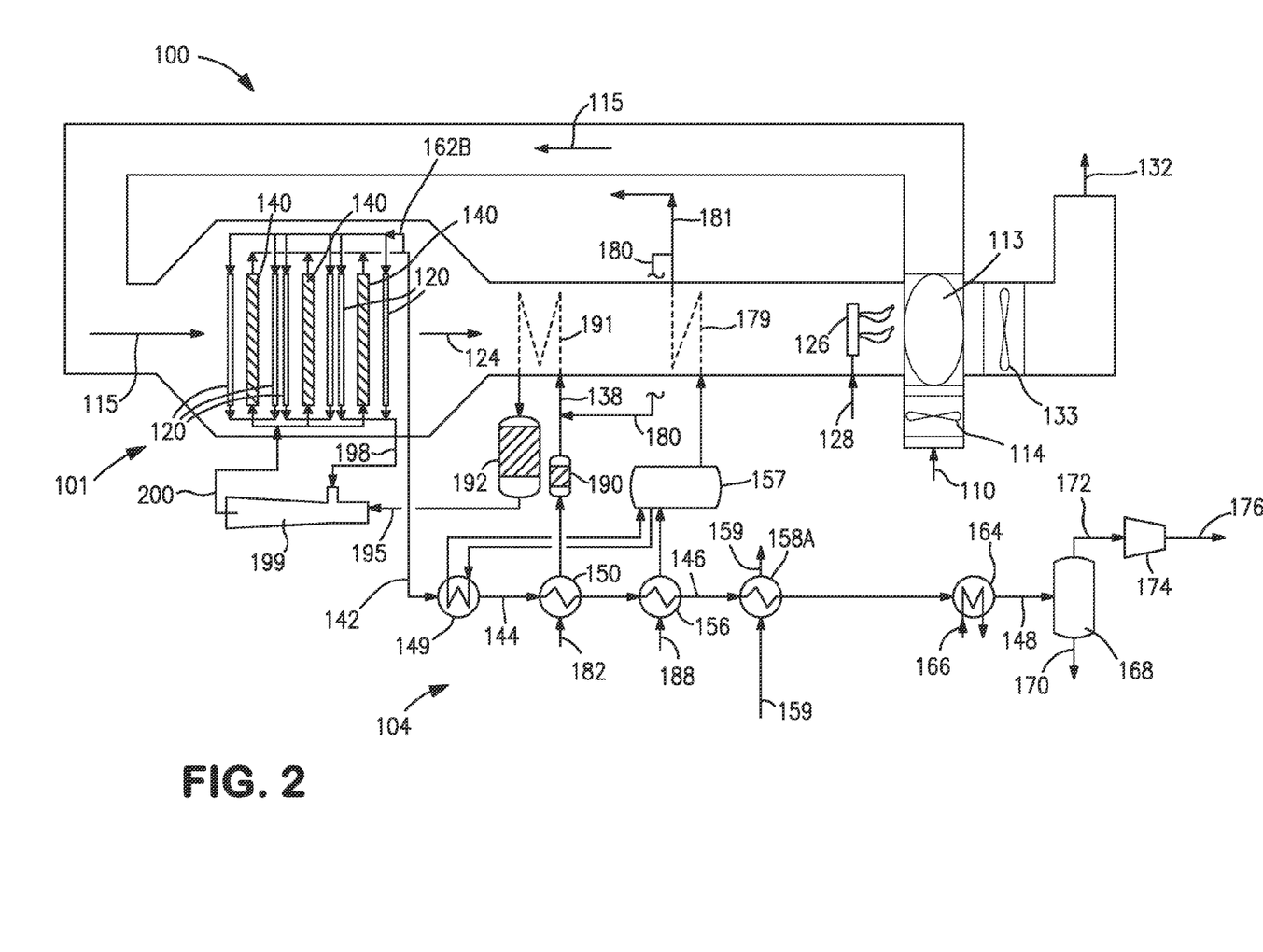
FIG. 2 is a schematic illustration of an alternate embodiment of an oxygen transport membrane based reforming system in accordance with the present invention.

Turning now to FIG. 2, there is shown a schematic illustration of an alternate embodiment of an oxygen transport membrane based reforming system. In many regards, this embodiment is similar to the embodiment of FIG. 1 and, for sake of brevity, the description of the common aspects of the two embodiments will not be repeated here, rather, the following discussion shall focus on the differences.

The primary difference between the embodiments in FIG. 1 and FIG. 2 is the use of a hot synthesis gas recycle 162B in the FIG. 2 embodiment in lieu of the cold gas recycle 162A in the embodiment of FIG. 1. As a result, the heat exchange section 104 in FIG. 2 is designed to only cool the produced synthesis gas stream 142 and need not recycle a portion of the cold synthesis gas stream 162A. By using the hot synthesis gas recycle 162B, there is no need to use the synthesis gas recycle compressor 177 or the second feed water heater 158B, used to heat feed water stream 159 potentially further reducing the capital cost of the oxygen transport membrane based reforming system.

The hot synthesis gas recycle involves recycling a portion of the heated synthesis gas stream 142 exiting the catalyst containing reforming tubes or reactor 140 and directing the hot recycled synthesis gas 162B to the permeate side of the oxygen transport membrane elements 120 to react the portion of heated synthesis gas stream 162B with the oxygen permeate stream to generate the heated reaction product stream and radiant heat. The temperature of the hot synthesis recycled gas is preferably above 800° C. so as to avoid problems associated with metal dusting corrosion.

The hot synthesis gas stream 162B is driven or pulled to the permeate side of the oxygen transport membrane elements 120 by means of an ejector, eductor or venturi based device 199 operatively coupled to the permeate side of the oxygen transport membrane elements 120. By suctioning the streams at the permeate side of the oxygen transport membrane elements 120 into the ejector, eductor or venturi based device 199 with a motive fluid comprising the pre-reformed reformer feed stream 195, the reaction product stream 198 mixes with the pre-reformed reformer feed stream 195 to produce the combined feed stream 200, preferably having a steam to carbon ratio between about 1.6 and 3.0 and a temperature between about 500° C. and 750° C. Essentially, device 199 moves lower pressure reaction product 198 to higher pressure combined feed stream 200.

Figure 3:
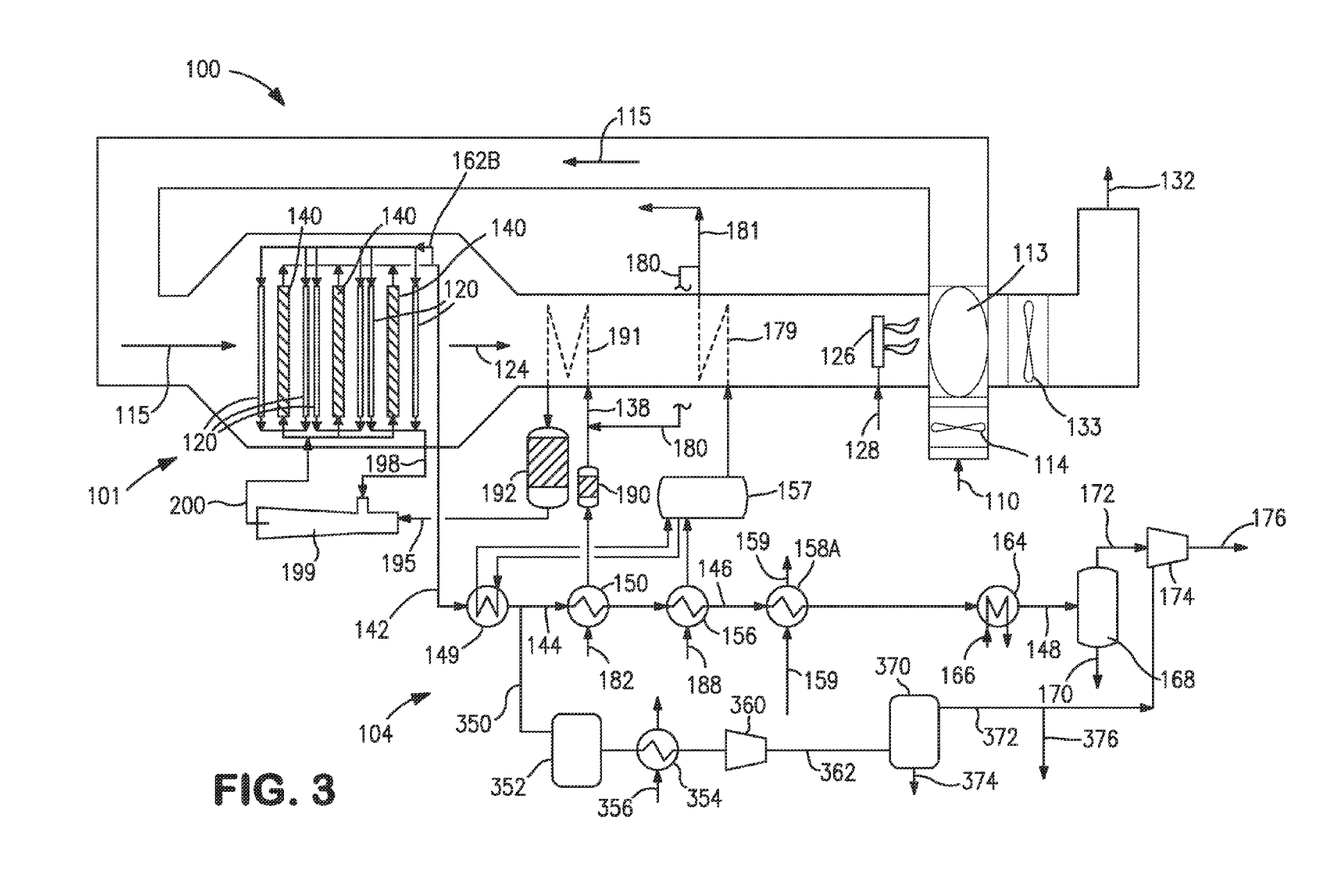
FIG. 3 is a schematic illustration of an alternate embodiment of an oxygen transport membrane based reforming system in accordance with the present invention for a methanol production facility, where the oxygen transport membrane based reforming system is the only or primary source of synthesis gas supply.

Turning now to FIG. 3, there is shown a schematic illustration of yet another alternate embodiment of an oxygen transport membrane based reforming system. In many regards, this illustrated embodiment is similar to the embodiments shown in FIG. 1 and FIG. 2. Thus, for sake of brevity; the description of the common aspects of the embodiments will not be repeated here. Rather, the following discussion shall focus on the differences present in the embodiment of FIG. 3. The primary difference between the embodiments in FIG. 2 and FIG. 3 is the addition of downstream processing of the initially cooled synthesis gas in the embodiment of FIG. 3. As seen therein, a portion of the initially cooled synthesis gas 350 is diverted to a synthesis gas conditioning system. This diverted portion of the cooled synthesis gas stream 350 is roughly between about 5% and 25% of the synthesis gas stream 142.

The diverted portion of the cooled synthesis gas stream 350 is subjected to a water shift reaction 352 and subsequently cooled in heat exchanger 354 using cooling water or boiler feed water and then compressed in a synthesis gas compressor 360. The compressed gas feed stream 362 is directed to a hydrogen pressure swing adsorption (PSA) unit 370 which takes the compressed feed stream 362 and produces a higher purity hydrogen stream 372 at or near the feed pressure while the carbon oxides, methane and other impurities are rejected at lower pressure tail gas stream 374. Stream 374 may be recycled to use with the duct burners 126 while the higher pressure and higher purity hydrogen stream 372 is recombined with the non-diverted portion of the synthesis gas stream 172, preferably at some point mid-stage point within the synthesis gas compressor 174. By re-combining the higher purity hydrogen stream 372 with the non-diverted portion of the synthesis gas stream 172, one can adjust the module of the final synthesis gas product to about 2.0 to 2.2, the preferable range for methanol production or other synthesis gas characteristics such as hydrogen to carbon monoxide ratio, etc.

One of the likely disadvantages of the previously disclosed oxygen transport membrane based reforming systems and reactors is the potential for corrosion, and in particular metal dusting corrosion. Metal dusting is a severe form of corrosion that occurs when surfaces of certain metal and metal alloy components and piping are exposed to severe gas environments with a high carbon activity or content. The metal dusting corrosion is manifested by a disintegration of bulk metals, such as iron, nickel and cobalt to metal powders. The typical metal dusting process results from a series of sequential steps, including (i) rapid uptake of carbon into the metallic phase leading to saturation of the alloy matrix with carbon; (ii) formation of metastable carbides; and (iii) decomposition of these carbides into a loose film of carbon and metallic particles, which acts as catalyst for further carbon deposition. The exact mechanism may vary depending on the type of metal being used. The temperatures normally associated with metal dusting are about 400° C. to 800° C. (i.e., about 760° F. to about 1500° F.). At temperatures generally below 400° C. the rate of reaction to form the metastable carbide species is too low to be significant, while at temperatures above 800° C. the carbon formation is minimal.

To avoid the metal dusting corrosion in the oxygen based transport membrane based reforming system and associated components and piping, the system should be designed to avoid contact of any synthesis gas with metal surfaces having temperatures between about 400° C. to 800° C. While it is possible to provide corrosion resistant coatings on all high temperature metal surfaces exposed to synthesis gas, such solution would be cost prohibitive. The alternative corrosion prevention technique employed in the present embodiments is to manage the temperatures of the synthesis gas so as to avoid contacting bare metal surfaces with synthesis gas in the deleterious temperature range where metal dusting corrosion occurs.

The present embodiments of the inventions achieve this temperature control of the metal surfaces exposed to the synthesis gas in several ways. In particular, for the embodiments illustrated in FIG. 2 and FIG. 3, the oxygen based transport membrane based reforming system preferably recycles the synthesis gas in a high temperature state, generally above 800° C. where the non-recycled portion of the synthesis gas is cooled in the PG boiler until the synthesis gas is cooled below 400° C. The metal surfaces of the synthesis gas piping exiting the reactor are either maintained at a temperature above 800° C. or have refractory surfaces. The metal surfaces in the PG boiler and other elements of the heat recovery system that are exposed to the synthesis gas are generally maintained at temperatures below about 400° C.

In the embodiment illustrated in FIG. 1, where cooled synthesis gas is recycled back to the oxygen based transport membrane based reactor, the cooled recycled synthesis gas stream is maintained at temperatures below about 400° C. The recycled synthesis gas stream 163 can be preheated against steam or any other stream as long as the wall temperature is less than about 400° C. For this reason, the addition of superheated steam to the recycled synthesis gas stream should be avoided unless the addition of superheated steam maintains the temperatures below about 400° C.

Figure 4:
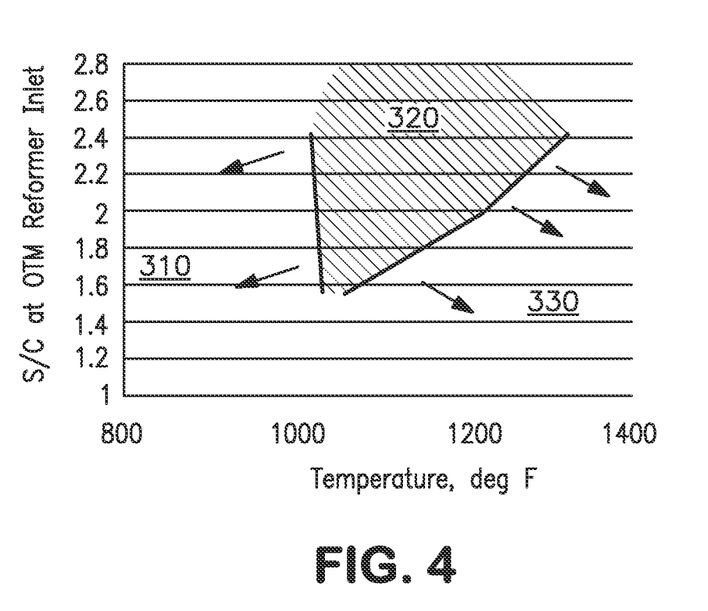
FIG. 4 is a graph of the temperature of a feed stream versus steam to carbon ratio of the feed stream and depicting various performance regimes of an oxygen transport membrane based reforming system.

Turning now to FIG. 4, region 310 on the feed temperature versus feed steam to carbon ratio graph generally corresponds to a combined feed stream feed at a temperature near or below about 500° C. and having a steam to carbon ratio of between 1.5 and 2.4. Because the present combined feed stream contains carbon monoxide produced in the pre-reformer, a combined feed stream having characteristics of region 310, may undergo unwanted Boudouard reactions thereby depositing excessive amounts of soot on the oxygen transport membrane based reforming system as well as associated components and piping. The Boudouard reaction is a redox reaction of a mixture of carbon monoxide and carbon dioxide at a given temperature and involves the disproportionation of carbon monoxide into carbon dioxide and carbon (i.e., soot).

On the other hand, region 330 generally corresponds to a region of high temperature and low steam to carbon ratios where the combined feed stream is subject to carbon lay down in the reforming catalysts. Region 330 is generally depicted as the region to the right of the curve or plot line on the feed temperature versus steam to carbon ratio defined by two points, namely a feed temperature of near 500° C. with a steam to carbon ratio of about 1.5 and a feed temperature of about 700° C. with a steam to carbon ratio of about 2.4 (See FIG. 4).

It has been found that conditioning the combined feed stream to a particular temperature range and steam to carbon ratio which avoids regions 310 and 330 translates into an optimum operating regime with noticeably less reliability problems in the oxygen transport membrane based reforming system due to carbon formation. This window of preferred operating characteristics for the combined feed stream is depicted generally as region 320 in FIG. 4.

While the present invention has been characterized in various ways and described in relation to preferred embodiments, as will occur to those skilled in the art, numerous, additions, changes and modifications thereto can be made without departing from the spirit and scope of the present invention as set forth in the appended claims.

What is claimed is:

1. A method for producing a synthesis gas in an oxygen transport membrane based reforming system, the method comprising the steps of:

separating an oxygen containing stream into an oxygen permeate and an oxygen depleted retentate stream using a plurality of oxygen transport membrane elements disposed in the oxygen transport membrane based reforming system;

oxidizing a hydrogen containing stream contacting a permeate side of the oxygen transport membrane elements with the oxygen permeate to generate a reaction product stream and heat;

pre-heating a hydrocarbon containing feed stream and combining the pre-heated hydrocarbon containing feed stream with steam and then with a portion of the reaction product stream to produce a combined feed stream having a steam to carbon ratio between about 1.6 and 3.0 and a temperature between about 500° C. and 750° C.;

reforming the combined feed steam in the at least one catalyst containing reforming reactor in the presence of the catalyst and the heat generated by the reaction of the hydrogen containing stream and permeated oxygen to produce a synthesis gas stream, the at least one catalyst containing reforming reactor disposed proximate the oxygen transport membrane elements; and recycling a portion of the synthesis gas stream to the permeate side of the plurality of oxygen transport membrane elements to form all or a part of the hydrogen containing stream wherein the recycled portion of the synthesis gas is maintained at a temperature of less than about 400° C. or a temperature of greater than about 800° C. such that the oxygen transport membrane based reforming system is substantially free of metal dusting corrosion.

2. The method of claim 1 wherein the step of recycling a portion of the synthesis gas stream further comprises directing a portion of the synthesis gas stream exiting the at least one catalyst containing reforming reactor to the permeate side of the oxygen transport membrane elements to form all or a part of the hydrogen containing stream that reacts with the permeated oxygen to generate the reaction product stream and the heat, wherein the a temperature of the recycled portion of the synthesis gas stream is greater than about 800° C.

3. The method of claim 2 wherein the step of combining the pre-heated hydrocarbon containing feed stream with a portion of the reaction product stream to produce a combined feed stream further comprises using an ejector, eductor, or venturi based device configured to suction the reaction product stream at the permeate side of the oxygen transport membrane elements into the ejector, eductor, or venturi based device with a motive fluid comprising the hydrocarbon containing feed stream or the hydrocarbon containing feed stream with steam to produce the combined feed stream.

4. The method of claim 1 wherein the step of recycling a portion of the synthesis gas stream further comprises:

cooling the synthesis gas stream exiting the at least one catalyst containing reforming reactor to a temperature less than about 400° C.;

compressing a portion of the cooled synthesis gas stream and maintaining the temperature of the cooled, compressed synthesis gas stream at a temperature less than about 400° C.; and directing the cooled, compressed synthesis gas stream at a temperature less than about 400° C. to the permeate side of the oxygen transport membrane elements to form all or a part of the hydrogen containing stream that reacts with the permeated oxygen to generate the reaction product stream and the heat.

5. The method of claim 1 wherein the steam is superheated steam at a pressure of between about 15 bar to 80 bar and a temperature of between about 300° C. and 600° C.

6. The method of claim 1 wherein the step of pre-heating the hydrocarbon feed stream further comprises pre-heating the hydrocarbon containing feed stream via indirect heat exchange with the synthesis gas stream or via indirect heat exchange with the oxygen depleted retentate stream or both.

7. An oxygen transport membrane based reforming system for producing synthesis gas comprising:
- a reactor housing;
- at least one catalyst containing reforming reactor disposed in the reactor housing and configured to produce a synthesis gas stream by reacting a combined feed stream in the presence of the catalyst and heat;
- a reactively driven oxygen transport membrane reactor disposed in the reactor housing proximate the at least one catalyst containing reforming reactor, the reactively driven oxygen transport membrane reactor comprising a plurality of oxygen transport membrane elements configured to separate oxygen from an oxygen containing feed stream and produce an oxygen permeate at a permeate side of the oxygen transport membrane elements and an oxygen depleted retentate stream at a retentate side of the oxygen transport membrane elements;
- a hydrogen containing stream in contact with the permeate side of the plurality of oxygen transport membrane elements, wherein the permeated oxygen oxidizes the hydrogen containing stream to reactively drive the separation of oxygen from the oxygen containing feed stream and to generate a reaction product stream and heat that is transferred to the oxygen depleted retentate stream and to at least one catalyst containing reforming reactor; and
- a synthesis gas recycle circuit configured to recycle a portion of the synthesis gas stream to the permeate side of the plurality of oxygen transport membrane elements to form all or a part of the hydrogen containing stream and wherein the recycled portion of the heated synthesis gas is maintained at a temperature of less than about 400° C. or a temperature of greater than about 800° C.;
- wherein the combined feed stream comprises a hydrocarbon containing feed, steam and the reaction product stream.

8. The system of claim 7 further comprising a heat exchange network fluidically coupled to the reforming reactor and configured to: (i) cool the synthesis gas stream exiting the at least one catalyst containing reforming reactor to a temperature of less than about 400° C.; (ii) produce the steam, and (iii) pre-heat the hydrocarbon containing feed stream.

9. The system of claim 8 wherein the heat exchange network further comprises:
- a first heat exchanger configured to cool the synthesis gas stream via indirect heat exchange with a process gas boiler feed stream and wherein the steam is produce from the indirect heat exchange between the synthesis gas stream and the process gas boiler feed water stream; and
- a second heat exchanger configured to pre-heat the hydrocarbon containing feed stream via indirect heat exchange with the cooled synthesis gas stream.

10. The system of claim 8 wherein the steam is heated via the heat exchange network to superheated steam at a pressure of between about 15 bar to 80 bar and a temperature of between about 300° C. and 600° C.

11. The system of claim 7 further comprising an ejector, eductor, or venturi based device coupled to the permeate side of the oxygen transport membrane elements and the inlet side of the catalyst containing reforming reactor and configured to suction the reaction product stream into the ejector, eductor, or venturi based device with the hydrocarbon containing feed stream with steam as a motive fluid to produce the combined feed stream.

12. The system of claim 7 wherein the combined feed stream has a steam to carbon ratio between about 1.6 and 3.0 and a temperature between about 500° C. and 750° C.

13. The system of claim 7 wherein the synthesis gas recycle circuit comprises a fluidic connection between the heat exchange network and the permeate side of the plurality of oxygen transport membrane elements to recirculate a portion of the cooled synthesis gas to the permeate side of the oxygen transport membrane elements as all or a portion of the hydrogen containing stream while maintaining the temperature of the cooled, compressed portion of the synthesis gas stream at a temperature less than about 400° C.

14. The system of claim 7 wherein the synthesis gas recycle circuit comprises a fluidic connection disposed within the reactor housing between an outlet of the catalyst containing reforming reactor and the permeate side of the oxygen transport membrane elements and configured to recirculate a portion of the synthesis gas exiting the catalyst containing reforming reactor to the permeate side of the oxygen transport membrane elements as all or a portion of the hydrogen containing stream while maintaining the temperature of the recirculated synthesis gas stream at a temperature greater than about 800° C.

15. The system of claim 7 further comprising:
- a burner disposed in an oxygen depleted retentate stream duct and configured to produce a heated exhaust stream using the oxygen depleted retentate stream and a source of supplemental fuel; and
- a continuously rotating ceramic regenerator configured to transfer heat from the heated exhaust stream to the oxygen containing feed stream.

16. A method for minimizing the formation of metal dusting corrosion in an oxygen transport membrane based synthesis gas reforming system, wherein said reforming system comprises:
- a reactor housing;
- at least one catalyst containing reforming reactor disposed in the reactor housing and configured to produce a synthesis gas stream by reacting a combined feed stream in the presence of the catalyst and heat wherein said combined feed stream comprises a hydrocarbon containing feed, steam and the reaction product stream;
- a reactively driven oxygen transport membrane reactor disposed in the reactor housing proximate the at least one catalyst containing reforming reactor, the reactively driven oxygen transport membrane reactor comprising a plurality of oxygen transport membrane elements configured to separate oxygen from an oxygen containing feed stream and produce an oxygen permeate at a permeate side of the oxygen transport membrane elements and an oxygen depleted retentate stream at a retentate side of the oxygen transport membrane elements;
- a hydrogen containing stream in contact with the permeate side of the plurality of oxygen transport membrane elements, wherein the permeated oxygen oxidizes the hydrogen containing stream to reactively drive the separation of oxygen from the oxygen containing feed stream and to generate a reaction product stream and heat that is transferred to the oxygen depleted retentate stream and to at least one catalyst containing reforming reactor; and
- a synthesis gas recycle circuit configured to recycle a portion of the synthesis gas stream to the permeate side of the plurality of oxygen transport membrane elements to form all or a part of the hydrogen containing stream, wherein said method comprises maintaining the temperature of said recycled synthesis gas stream at a temperature of less than about 400° C. or a temperature of greater than about 800° C.

* * * * *